(12) United States Patent
Tsuruta et al.

(10) Patent No.: US 9,214,652 B2
(45) Date of Patent: Dec. 15, 2015

(54) ELECTRIC STORAGE ELEMENT AND METHOD FOR MANUFACTURING ELECTRIC STORAGE ELEMENT

(71) Applicant: GS Yuasa International Ltd., Kyoto-shi (JP)

(72) Inventors: Shogo Tsuruta, Kyoto (JP); Syun Ito, Kyoto (JP); Hirokazu Kambayashi, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 324 days.

(21) Appl. No.: 13/765,405

(22) Filed: Feb. 12, 2013

(65) Prior Publication Data

US 2013/0209859 A1     Aug. 15, 2013

(30) Foreign Application Priority Data

Feb. 15, 2012  (JP) .................... 2012-030821
Jan. 15, 2013  (JP) .................... 2013-004871

(51) Int. Cl.
| | |
|---|---|
| *H01M 2/14* | (2006.01) |
| *H01M 2/02* | (2006.01) |
| *H01M 10/04* | (2006.01) |
| *H01R 43/16* | (2006.01) |
| *H01G 9/145* | (2006.01) |
| *H01G 9/06* | (2006.01) |
| *H01G 9/08* | (2006.01) |
| *H01G 11/82* | (2013.01) |
| *H01M 10/052* | (2010.01) |
| *H01M 10/058* | (2010.01) |

(52) U.S. Cl.
CPC ............ *H01M 2/024* (2013.01); *H01G 9/06* (2013.01); *H01G 9/08* (2013.01); *H01G 9/145* (2013.01); *H01G 11/82* (2013.01); *H01M 2/14* (2013.01); *H01R 43/16* (2013.01); *H01M 2/0275* (2013.01); *H01M 10/052* (2013.01); *H01M 10/058* (2013.01); *Y02E 60/122* (2013.01); *Y02E 60/13* (2013.01); *Y02T 10/7011* (2013.01); *Y02T 10/7022* (2013.01); *Y10T 29/49208* (2015.01)

(58) Field of Classification Search
CPC ......... H01M 6/08; H01M 2/02; H01M 2/022; H01M 2/067
See application file for complete search history.

(56) References Cited

U.S. PATENT DOCUMENTS

| | | | | | |
|---|---|---|---|---|---|
| 1,765,673 | A | * | 6/1930 | Huntley | 429/86 |
| 2,704,780 | A | * | 3/1955 | MacFarland | 429/66 |
| 3,447,968 | A | * | 6/1969 | Rightmire | 429/112 |
| 3,904,433 | A | * | 9/1975 | Frazier | 429/94 |
| 5,817,435 | A | * | 10/1998 | Shimakawa et al. | 429/176 |
| 6,132,573 | A | * | 10/2000 | Cubukcu et al. | 204/262 |
| 7,709,143 | B2 | | 5/2010 | Lee | |
| 2005/0069764 | A1 | * | 3/2005 | Kodama et al. | 429/185 |
| 2006/0024578 | A1 | * | 2/2006 | Lee | 429/208 |
| 2011/0318621 | A1 | * | 12/2011 | Mineya et al. | 429/94 |

FOREIGN PATENT DOCUMENTS

| | | |
|---|---|---|
| JP | 2006-040899 A | 2/2006 |
| JP | 2011-150961 A | 8/2011 |

* cited by examiner

*Primary Examiner* — Kenneth Douyette
(74) *Attorney, Agent, or Firm* — McGinn IP Law Group, PLLC.

(57) ABSTRACT

An electric storage element includes: an electrode body having a positive electrode and a negative electrode; a case for housing the electrode body; an insulating member arranged in the case to insulate the electrode body from the case; and a spacer arranged in the case. The spacer is arranged between the insulating member and the electrode body.

18 Claims, 14 Drawing Sheets

ELECTRIC STORAGE ELEMENT AND METHOD FOR MANUFACTURING ELECTRIC STORAGE ELEMENT

BACKGROUND OF THE INVENTION

1. Field of the Invention

The present invention relates to an electric storage element provided with an electrode body having a positive electrode and a negative electrode, an insulating member for insulating the electrode body from a case, and a spacer arranged in the case, and a method for manufacturing the electric storage element.

2. Description of the Related Art

As an approach to global environmental issues, it becomes increasingly important to convert a gasoline car to an electric car. Thus, an electric car having an electric storage element such as a lithium-ion secondary battery as its power source has been developed.

An electric storage element houses an electrode body having a positive electrode and a negative electrode in a case. Because of a space between the electrode body and the case, extra electrolyte solution may be needed. The space may cause a swing or vibration of the electrode body in the case. Conventionally, a battery has been proposed in which a spacer is provided between the electrode body and the case so that the space between the electrode body and the case can be reduced (for example, refer to JP-A-2006-40899).

However, according to the conventional electric storage element, it is necessary to insert the spacer into the case in addition to the electrode body when the electric storage element is manufactured, which complicates a step of inserting them into the case. In addition, after the spacer has been inserted into the case, the spacer could be shifted in position in the case.

SUMMARY OF THE INVENTION

An aspect of the present invention provides an electric storage element including an electrode body having a positive electrode and a negative electrode, a case for housing the electrode body, an insulating member arranged in the case to insulate the electrode body from the case, and a spacer arranged in the case, wherein the spacer is arranged between the insulating member and the electrode body.

BRIEF DESCRIPTION OF THE DRAWINGS

The foregoing and other features of the invention will become apparent to one skilled in the art to which the present invention relates upon consideration of the invention with reference to the accompanying drawings, wherein.

DETAILED DESCRIPTION OF THE INVENTION

Figure 1:
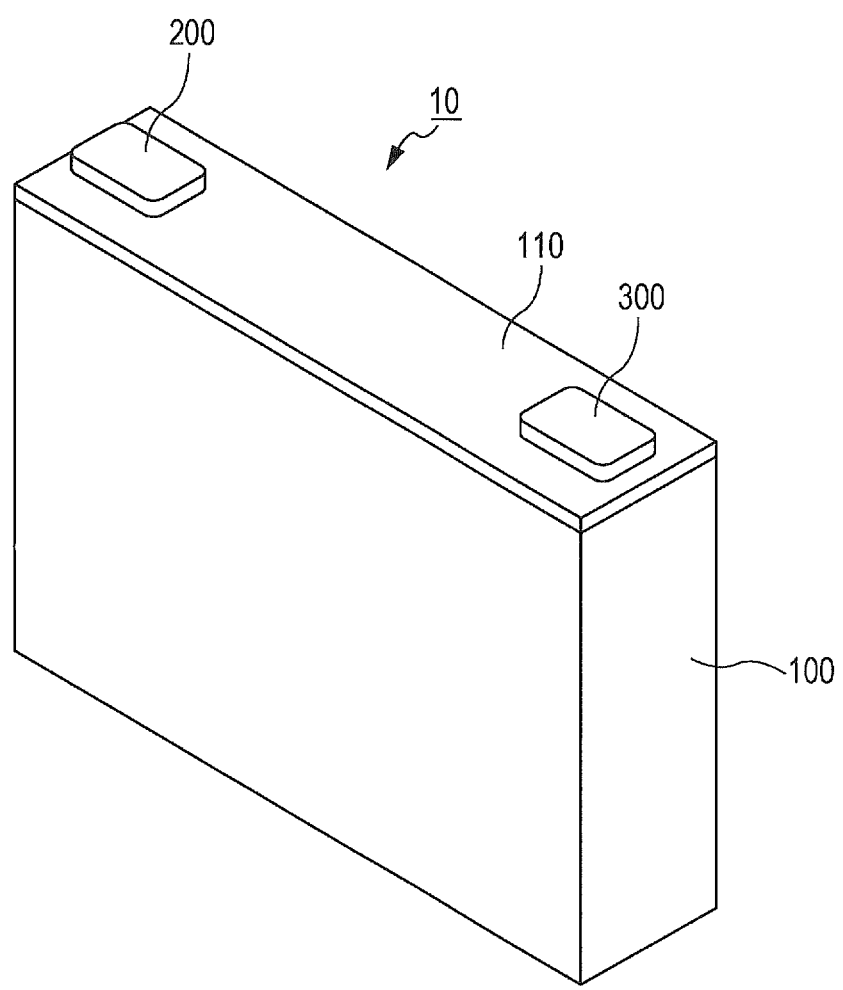
FIG. 1 is a perspective view schematically showing an outer appearance of an electric storage element according to an embodiment of the present invention.

As described above, an aspect of the present invention provides an electric storage element including an electrode body having a positive electrode and a negative electrode, a case for housing the electrode body, an insulating member arranged in the case to insulate the electrode body from the case, and a spacer arranged in the case, wherein the spacer is arranged between the insulating member and the electrode body.

With this configuration, the electric storage element has the configuration in which the spacer is arranged between the insulating member and the electrode body. That is, the spacer is fixed to the electrode body under the condition that it is sandwiched between the insulating member and the electrode body. Thus, the spacer is inserted into the case under the condition that it is fixed between the insulating member and the electrode body, whereby the electric storage element is provided. Thus, since the spacer is inserted into the case under the condition that it is fixed to the electrode body with the insulating member, the spacer can be smoothly inserted into the case, while the spacer is prevented from being shifted in position in the case.

The spacer may be configured to reduce a space between the electrode body and the case, and suppress the electrode body from moving in the case.

With this configuration, the spacer having a relatively large volume is arranged along a bottom surface or a side surface of the case, and fixed to the electrode body under the condition that it is sandwiched between the insulating member and the electrode body. Thus, the spacer is inserted into the case under the condition that a relative position between the electrode body and the spacer is fixed with the insulating member. Therefore, even when the spacer is a bottom spacer which is inserted into the case ahead of the electrode body and arranged along the bottom surface of the case, the bottom spacer can be prevented from being shifted in position in the case.

The insulating member may be arranged to cover the spacer and the electrode body.

The electric storage element has the configuration in which the insulating member is arranged so as to cover the electrode body and the spacer. That is, the insulating member wraps around the electrode body and the spacer to fix the electrode body and the spacer. Therefore, the spacer is covered with the insulating member, fixed to the electrode body, and inserted into the case, so that the spacer can be smoothly inserted into the case, while the spacer is prevented from being shifted in position in the case.

The insulating member may be a sheet-shaped member.

With this configuration, since the insulating member is the sheet-shaped member, it can easily wrap around the spacer and fix it to the electrode body.

The insulating member may be bonded or welded to the spacer.

With this configuration, the spacer can be effectively prevented from being shifted in position in the case.

The spacer may have an internal part opposed to the electrode body, and two side parts arranged on both sides of the internal part, and at least one side part of the two side parts and the internal part may be connected through a curved surface.

With this configuration, at least one side part and the internal part of the spacer are connected through the curved surface. That is, the spacer has a round tip end which comes in contact with the electrode body when it is fixed to the electrode body. Thus, when the spacer is fixed to the electrode body, the electrode body is prevented from being damaged with the tip end of the spacer.

The spacer may have an internal part opposed to the electrode body, two side parts arranged on both sides of the internal part, and an external part arranged between the two side parts and opposed to the insulating member, and at least one side part of the two side parts and the external part may be connected through a curved surface.

With this configuration, at least one side part and the external part of the spacer are connected through the curved surface. That is, the spacer has a round corner part which comes in contact with the insulating member. Thus, even when the spacer and the insulating member are brought into contact with each other due to vibration or the like, the insulating member can be prevented from being damaged with the corner part of the spacer.

The spacer may be an insulating member.

With this configuration even when the insulating member is damaged while the spacer is wrapped with the insulating member and fixed to the electrode body, an insulating property can be kept between the electrode body and the case.

The electrode body may have a coated region having active materials applied to surfaces of the positive electrode and the negative electrode, and a non-coated region not having the active material on the surface of the positive electrode or the negative electrode, the spacer may have a first part opposed to the non-coated region, and a second part opposed to the coated region, and the first part may be thicker than the second part.

With this configuration, the first part of the spacer opposed to the non-coated region of the active material is thicker than the second part of the spacer opposed to the coated region of the active material. In the non-coated region, the performance of the electric storage element is not likely to be degraded even when compression is applied thereto. According to this electric storage element, in order to enhance vibration resistance thereof, the first part of the spacer opposed to the non-coated region is formed to be thicker than the second part and thus compression is applied to the non-coated region, so that the vibration resistance can be enhanced, while the performance of the electric storage element is prevented from being degraded. In addition, the coated region is likely to be expanded due to repeated charge-discharge, and the performance of the electric storage element is likely to be degraded when it is excessively compressed. Therefore, the second part is formed to be thinner than the first part in the spacer, so that there can be provided a space for tolerating the expansion of the electrode body, and the performance of the electric storage element can be prevented from being degraded even when the electrode body is expanded.

A clearance between the second part of the spacer and the coated region of the electrode body may be larger than a clearance between the first part of the spacer and the non-coated region of the electrode body.

With this configuration, the spacer is formed in such a manner that the clearance between the spacer and the coated region of the electrode body is larger than the clearance between the spacer and the non-coated region of the electrode body. Therefore, even when the coated region of the electrode body is expanded due to the repeated charge-discharge, the expansion of the coated region of the electrode body can be tolerated because the clearance is large in the coated region. In addition, since the clearance is small in the non-coated region of the electrode body in which the performance of the electric storage element is not likely to be degraded due to the compression, the vibration resistance can be improved while the performance of the electric storage element is prevented from being degraded.

The shape of the first part of the spacer on a side of the electrode body may follow an outer surface of the electrode body.

With this configuration, since the shape of the first part of the spacer on the side of the electrode body follows the shape of the electrode body, the clearance can be minimized in the first part. As a result, the vibration resistance can be further improved in the first part of the spacer.

The spacer may have the two first parts arranged at both ends in a longitudinal direction, the two second parts connected to the two first parts, respectively, and a third part thinner than the two second parts, between the two second parts.

With this configuration, the spacer has the third part thinner than the second part, between the two second parts. That is, since the electrode body can be supported with the first part and the second part of the spacer, the third part provided between the two second parts and not used for supporting the electrode body can be thinned, so that costs can be reduced due to a reduction in amount of a component material.

Another aspect of the present invention provides a method for manufacturing an electric storage element including an electrode body having a positive electrode and a negative electrode, a case for housing the electrode body, an insulating member arranged in the case to insulate the electrode body from the case, and a spacer arranged in the case, the method including an arranging step of arranging the spacer between the insulating member and the electrode body, and an inserting step of inserting the spacer into the case together with the insulating member and the electrode body.

With this configuration, the spacer is arranged between the insulating member and the electrode body. That is, the spacer is fixed to the electrode body under the condition that it is sandwiched between the insulating member and the electrode body. Thus, the spacer is inserted into the case under the condition that it is fixed between the insulating member and the electrode body, whereby the electric storage element is provided. Thus, since the spacer is inserted into the case under the condition that it is fixed to the electrode body with the insulating member, the spacer can be smoothly inserted into the case, while the spacer is prevented from being shifted in position in the case.

In the arranging step, the spacer may be arranged between the insulating member and the electrode body such that the spacer and the electrode body are covered with the insulating member.

With this configuration, the spacer is arranged between the insulating member and the electrode body such that the spacer and the electrode body are covered with the insulating member. That is, the insulating member wraps around the electrode body and the spacer to fix the electrode body and the spacer. Therefore, the spacer is covered with the insulating member, fixed to the electrode body, and inserted into the case, so that the spacer can be smoothly inserted into the case, while the spacer is prevented from being shifted in position in the case.

In the arranging step, the spacer may be set on the insulating member, the electrode body, which is formed into an oval shape by winding the elongated band-shaped positive electrode and negative electrode around a winding axis, may be put sideways, and the insulating member may be wound around the electrode body such that the spacer is arranged between the insulating member and the electrode body.

With this configuration, manufacturing efficiency can be improved.

Preferred embodiments of the present invention will be described. Hereinafter, a description will be given of an electric storage element and a method for manufacturing the electric storage element according to an embodiment of the present invention, with reference to the drawings. In addition, each embodiment which will be described below shows one preferred specific example of the present invention. Numeric values, shapes, materials, components, and arranged positions and connected configurations of the components shown in the following embodiment are illustrative only, and do not limit the present invention.

First, a configuration of an electric storage element 10 will be described.

Figure 2:
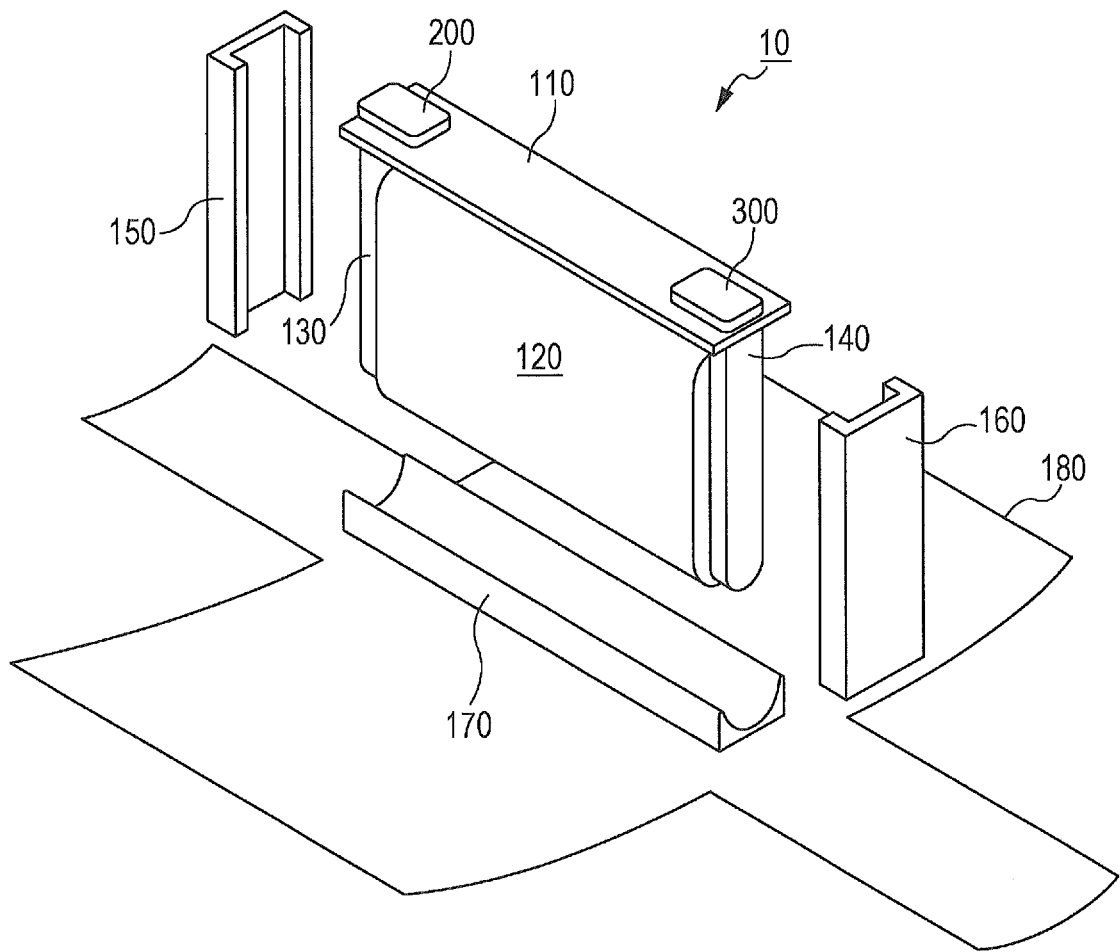
FIG. 2 is an exploded perspective view of the electric storage element other than a case according to the embodiment of the present invention.

FIG. 1 is a perspective view schematically showing an outer appearance of the electric storage element 10 according to an embodiment of the present invention. FIG. 2 is an exploded perspective view of the electric storage element 10 according to the embodiment of the present invention other than a case 100. That is, FIG. 2 is a view showing components arranged in the case 100 of the electric storage element 10.

The electric storage element 10 serves as a secondary battery capable of charging and discharging electricity and more specifically, serves as a non-aqueous electrolyte battery such as a lithium-ion secondary battery.

As shown in FIGS. 1 and 2, the electric storage element 10 is provided with the case 100, and a lid plate 110, a positive electrode terminal 200, and a negative electrode terminal 300 which are provided in an upper part of the case 100. In addition, the case 100 contains an electrode body 120, a positive electrode collector 130, a negative electrode collector 140, side spacers 150 and 160, a bottom spacer 170, and an insulating member 180.

In addition, a liquid such as an electrolyte solution is encapsulated in the case 100 of the electric storage element 10, but the liquid is not shown in the drawing. Incidentally, the electric storage element 10 is not limited to the non-aqueous electrolyte battery, and it may be a secondary battery other than the non-aqueous electrolyte battery, or may be a capacitor.

The case 100 is a bottomed rectangular cylindrical case body made of metal, and an opening of the case body is covered with the metal lid plate 110. That is, the case 100 can be hermetically sealed by being soldered with the lid plate 110 after the electrode body 120 and the like have been housed therein. In this embodiment, the opening of the case 100 is defined as having a surface opposed to a bottom surface of the case 100.

The electrode body 120 is provided with a positive electrode, a negative electrode, and a separator although they are not described in detail, and serves as a member capable of storing electricity. The positive electrode is provided by forming an active material layer for the positive electrode on a surface of an elongated band-shaped positive electrode base member made of aluminum foil. The negative electrode is provided by forming an active material layer for the negative electrode on a surface of an elongated band-shaped negative electrode base member made of copper foil. The separator is a macro-porous sheet made of resin. The electrode body 120 is formed in such a manner that the above components are wound into the form of an oval shape as a whole in layers with the separator sandwiched between the negative electrode and the positive electrode.

More specifically, the positive electrode and the negative electrode are shifted in a width direction of the elongated band from each other with the separator interposed therebetween and wound around a winding axis along the width direction into the oval shape. Thus, by forming a region having no active material applied, in an edge part of each of the positive electrode and the negative electrode in their shifted direction, the aluminum foil of the positive electrode base member on which the active material is not formed is exposed to one end of the winding axis, and the copper foil of the negative electrode base member on which the active material is not formed is exposed to another end of the winding axis. In addition, the positive electrode collector 130 and the negative electrode collector 140 which extend in a direction vertical to a winding axis direction are arranged in ends of the electrode body 120 in the winding axis direction, respectively.

In addition, the electrode body 120 has a flat part in which the positive electrode, the negative electrode, and the separator are laminated in a flat surface, and a curved part in which they are laminated in a curved surface. Thus, the electrode body 120 is housed in the case 100 in such a manner that the curved part is opposed to the bottom surface of the case 100.

Here, the active material for the positive electrode includes a polyanion compound such as $LiMPO_4$, $LiMSiO_4$, or $LiMBO_3$ (M is one or more kinds of transition metal elements selected from Fe, Ni, Mn, Co, and the like), a spinel compound such as lithium titanate or lithium manganite, and a lithium transition metal oxide such as $LiMO_2$ (M is one or more kinds of transition metal elements selected from Fe, Ni, Mn, Co, and the like).

In addition, the active material for the negative electrode may be a well-known material as long as the material can absorb and emit lithium ions. For example, the material includes lithium metal, lithium alloy (alloy containing lithium metal such as lithium-silicon, lithium-aluminum, lithium-lead, lithium-tin, lithium-aluminum-tin, lithium-gallium, or wood's alloy) as well as an alloy capable of absorbing and emitting lithium, a carbon material (such as black lead, non-graphitizable carbon, graphitizable carbon, low-temperature fired carbon, or amorphous carbon), silicon oxide, metal oxide, lithium metal oxide (such as $Li_4Ti_5O_{12}$), and polyphosphate compound.

The oval shape is shown as the shape of the electrode body 120 in FIG. 2, but the shape may be a circular shape or ellipsoidal shape.

The positive electrode terminal 200 serves as an electrode terminal electrically connected to the positive electrode of the electrode body 120, and the negative electrode terminal 300 serves as an electrode terminal electrically connected to the negative electrode of the electrode body 120. That is, each of the positive electrode terminal 200 and the negative electrode terminal 300 serves as the metal electrode terminal which discharges electricity stored in the electrode body 120 to an external space of the electric storage element 10, and introduces electricity into the internal space of the electric storage element 10 in order to store electricity in the electrode body 120. In addition, the positive electrode terminal 200 and the negative electrode terminal 300 are mounted on the lid plate 110 arranged in the upper part of the electrode body 120.

The positive electrode collector 130 is arranged between the positive electrode of the electrode body 120 and a side wall of the case 100, and it is a conductive and rigid member electrically connected to the positive electrode terminal 200 and the positive electrode of the electrode body 120. The positive electrode collector 130 is made of aluminum, similar to the positive electrode of the electrode body 120.

The negative electrode collector 140 is arranged between the negative electrode of the electrode body 120 and a side wall of the case 100, and it is a conductive and rigid member electrically connected to the negative electrode terminal 300 and the negative electrode of the electrode body 120. The negative electrode collector 140 is made of copper, similar to the negative electrode of the electrode body 120.

The side spacers 150 and 160 are arranged between the positive electrode collector 130 and the side wall of the case 100, and between the negative electrode collector 140 and the side wall of the case 100, respectively, and serve as elongated insulating members extending along the positive electrode collector 130 and the negative electrode collector 140, respectively. For example, the side spacers 150 and 160 are made of resin such as polypropylene (PP). That is, the side spacers 150 and 160 insulate the positive electrode collector 130 and the negative electrode collector 140 from the case 100, respectively. Furthermore, the side spacers 150 and 160 fill a space between the positive electrode collector 130 and the case 100 and a space between the negative electrode collector 140 and the case 100, respectively, so that the electrode body 120 is prevented from vibrating with the case 100 via the positive electrode collector 130 and the negative electrode collector 140.

The bottom spacer 170 is arranged between the electrode body 120 and the bottom surface of the case 100 and serves as an elongated insulating member extending along the winding axis direction of the electrode body 120. For example, the bottom spacer 170 is made of resin such as polypropylene (PP). More specifically, the bottom spacer 170 is arranged between the bottom surface of the case 100 and the curved part of the electrode body 120. That is, the bottom spacer 170 insulates the electrode body 120 from the case 100. Furthermore, the bottom spacer 170 fills a space between the electrode body 120 and the case 100, so that the electrode body 120 is prevented from vibrating with the case 100. A configuration of the bottom spacer 170 will be described in detail later.

An insulating member 180 insulates the electrode body 120 from the case 100. More specifically, the insulating member 180 is a sheet-shaped insulating member, and arranged so as to cover the bottom spacer 170 and the electrode body 120. That is, the insulating member 180 is shaped like an exploded bag, and wraps around the bottom spacer 170, the side spacers 150 and 160, the positive electrode collector 130, the negative electrode collector 140, and a side surface of the electrode body 120, from beneath the bottom spacer 170. Thus, the bottom spacer 170, and the side spacers 150 and 160 are arranged between the insulating member 180 and the electrode body 120.

Thus, when the insulating member 180 is formed, its size is adjusted so as to wrap around the bottom spacer 170, the side spacers 150 and 160, and the electrode body 120. Incidentally, the insulating member 180 may not necessarily wrap around the whole of the electrode body 120, but may be formed so as to only cover part of the electrode body 120. Incidentally, the insulating member 180 may have any shape as long as it can be formed into the bag shape.

Figure 3:
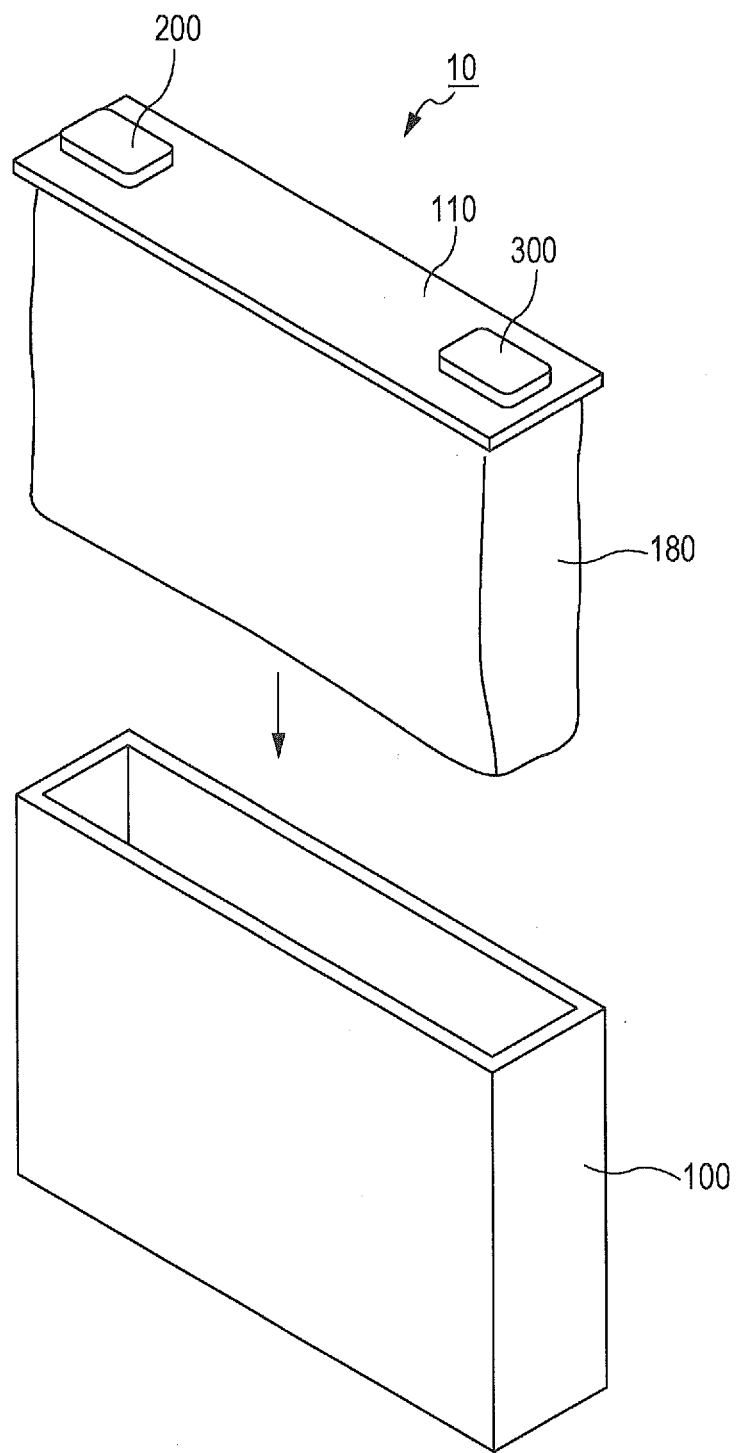
FIG. 3 is a view showing that a bottom spacer and an electrode body are to be inserted into the case under the condition that they are covered with an insulating member according to the embodiment of the present invention.

FIG. 3 is a view showing that the bottom spacer 170 and the electrode body 120 covered with the insulating member 180 are to be inserted into the case 100 according to the embodiment of the present invention.

As shown in FIG. 3, the insulating member 180 covers the bottom spacer 170, the side spacers 150 and 160, the positive electrode collector 130, the negative electrode collector 140, and the electrode body 120 so as to wrap around them from beneath the bottom spacer 170. Thus, a component group covered with the insulating member 180 is inserted into the case 100.

Next, the configuration of the bottom spacer 170 will be described in detail.

Figure 4:
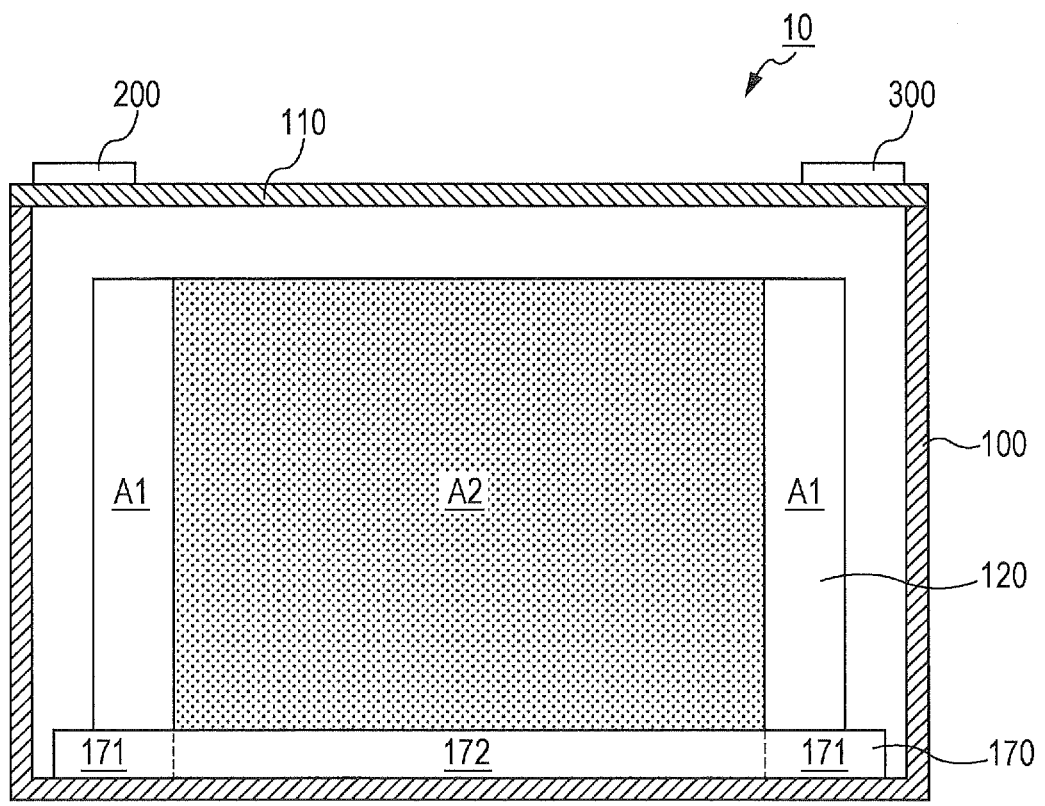
FIG. 4 is a view showing a positional relationship between the electrode body and the bottom spacer in the electric storage element according to the embodiment of the present invention.

FIG. 4 is a view showing a positional relationship between the electrode body 120 and the bottom spacer 170 in the electric storage element 10 according to the embodiment of the present invention. In FIG. 4, the positive electrode collector 130, the negative electrode collector 140, the side spacers 150 and 160, and the insulating member 180 are not shown.

Figure 5A:
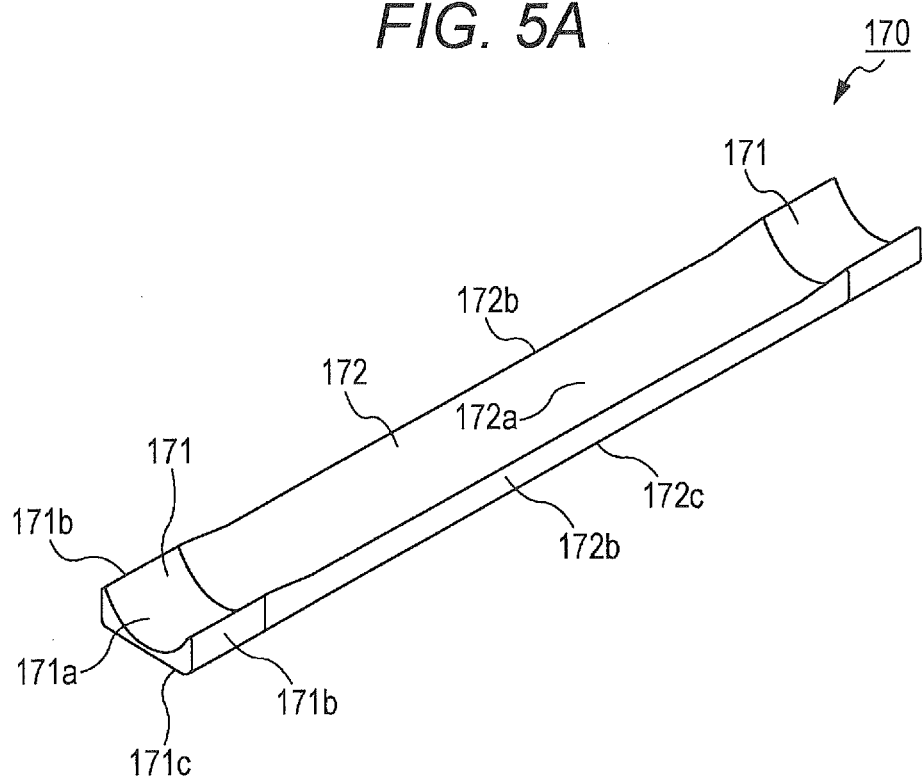
FIG. 5A is a view showing a configuration of the bottom spacer according to the embodiment of the present invention.
Figure 5B:
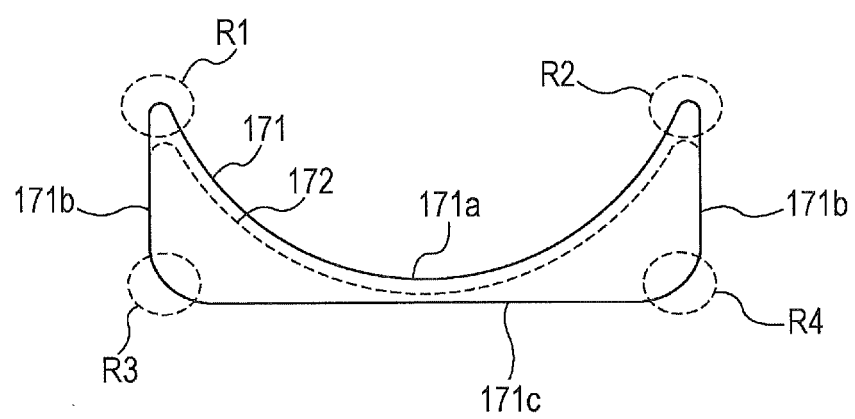
FIG. 5B is a view showing a configuration of the bottom spacer according to the embodiment of the present invention.

FIGS. 5A and 5B are views showing the configuration of the bottom spacer 170 according to the embodiment of the present invention. More specifically, FIG. 5A is an oblique perspective view of an outer appearance of the bottom spacer 170, and FIG. 5B is a view of the bottom spacer 170 taken from lower left in FIG. 5A.

First, as shown in FIG. 4, a non-coated region A1 in which the active material is not applied to the positive electrode or the negative electrode is provided in each end of the electrode body 120 in the winding axis direction, and a coated region A2 in which the active material is applied to each of the positive electrode and the negative electrode is provided between the non-coated regions A1 in the center of the electrode body 120 in the winding axis direction.

Thus, the bottom spacer 170 has two first parts 171 opposed to the non-coated regions A1 of the electrode body 120, and a second part 172 opposed to the coated region A2 of the electrode body 120. As for the bottom spacer 170, a cross-sectional shape of the first part 171 is different from a cross-sectional shape of the second part 172 when viewed from a plane perpendicular to the winding axis direction of the electrode body 120.

More specifically, as shown in FIGS. 5A and 5B, the first part 171 is formed to be thicker than the second part 172. That is, a clearance between the second part 172 of the bottom spacer 170 and the coated region A2 of the electrode body 120 is larger than a clearance between the first part 171 of the bottom spacer 170 and the non-coated region A1 of the electrode body 120.

In addition, the first part 171 has an internal part 171a, two side parts 171b, and an external part 171c.

The internal part 171a is opposed to the electrode body 120 and has a shape along an outer surface of the electrode body 120. That is, a shape of the first part 171 of the bottom spacer 170 on the side of the electrode body 120 follows an outer surface of the non-coated region A1 of the electrode body 120. More specifically, the internal part 171a has a dented curved shape.

The side part 171b has a flat surface provided on each side of the internal part 171a. That is, a side shape of the first part 171 of the bottom spacer 170 follows an internal side surface of the case 100.

The external part 171c is a flat surface arranged between the two side parts 171b so as to be opposed to the insulating member 180. That is, a bottom shape of the first part 171 of the bottom spacer 170 follows an internal bottom surface of the case 100.

Thus, at least one side part 171b of the two side parts 171b and the internal part 171a are connected through a curved surface. That is, as shown in FIG. 5B, the two side parts 171b and the internal part 171a are connected through curved surfaces R1 and R2, respectively. Incidentally, the curved surfaces R1 and R2 may have any shape as long as they are curved, and for example, each of them may have an arc shaped cross-section having a radius of 1 mm to 2 mm.

In addition, at least one side part 171b of the two side parts 171b and the external part 171c are connected through a curved surface. That is, as shown in FIG. 5B, the two side parts 171b and the external part 171c are connected through curved surfaces R3 and R4, respectively. Incidentally, the curved surfaces R3 and R4 may have any shape as long as they are curved, and for example, each of them may have an arc shaped cross-section having a radius of 1 mm to 3 mm.

Similar to the first part 171, the second part 172 has an internal part 172a, two side parts 172b, and an external part 172c.

The internal part 172a is opposed to the electrode body 120 and has a shape along an outer surface of the electrode body 120. That is, a shape of the second part 172 of the bottom spacer 170 on the side of the electrode body 120 follows an outer surface of the coated region A2 of the electrode body 120. More specifically, the internal part 172a has a dented curved shape.

The side part 172b is provided on each side of the internal part 172a. That is, a side shape of the second part 172 of the bottom spacer 170 follows an internal side surface of the case 100.

The external part 172c is a surface arranged between the two side parts 172b so as to be opposed to the insulating member 180. That is, a bottom shape of the second part 172 of the bottom spacer 170 follows an internal bottom surface of the case 100.

Thus, similar to the first part 171, at least one side part 172b of the two side parts 172b and the internal part 172a are connected through a curved surface. Here, both of the two side parts 172b and the internal part 172a are connected through the curved surfaces. Incidentally, the curved surface may have any shape as long as it is curved, and for example, it may have an arc shaped cross-section having a radius of 1 mm to 2 mm.

In addition, similar to the first part 171, at least one side part 172b of the two side parts 172b and the external part 172c are connected through a curved surface. Here, both of the two side parts 172b and the external part 171c are connected through the curved surfaces. Incidentally, the curved surface may have any shape as long as it is curved, and for example, it may have an arc shaped cross-section having a radius of 1 mm to 3 mm.

As described above, as for the bottom spacer 170, the curved surface is provided at each end of the bottom spacer 170 in a width direction, at each tip end of the side part arranged so as to extend in a longitudinal direction of the bottom spacer 170 along the side of the electrode body 120.

In addition, similar to the first part 171 and the second part 172, an internal part of each of the side spacers 150 and 160 opposed to the electrode body 120, and two side parts arranged on both sides of the internal part thereof may be connected though curved surfaces. In addition, the two side parts of each of the side spacers 150 and 160 and an external part arranged between the two side parts so as to be opposed to the insulating member 180 may be connected through curved surfaces.

As described above, according to the electric storage element 10 in the embodiment of the present invention, the bottom spacer 170 is arranged between the insulating member 180 and the electrode body 120. That is, the bottom spacer 170 having a relatively large volume which is arranged along the bottom surface of the case 100, is fixed to the electrode body 120 under the condition that it is sandwiched between the insulating member 180 and the electrode body 120. Thus, the bottom spacer 170 is inserted into the case 100 under the condition that it is fixed between the insulating member 180 and the electrode body 120 (that is, under the condition that a relative position between the electrode body 120 and the bottom spacer 170 is fixed with the insulating member 180), whereby the electric storage element 10 is provided. Thus, the bottom spacer 170 is inserted into the case 100 ahead of the electrode body 120 and pushed by the electrode body 120 toward the bottom of the case 100 under the condition that it is fixed to the electrode body 120 with the insulating member 180, so that the bottom spacer 170 can be smoothly inserted into the case 100, while the bottom spacer 170 is prevented from being shifted in position in the case 100.

In addition, the electric storage element 10 has the configuration in which the insulating member 180 is arranged so as to cover the electrode body 120 and the bottom spacer 170. That is, the insulating member 180 fixes the electrode body 120 and the bottom spacer 170 while wrapping around the electrode body 120 and the bottom spacer 170. Therefore, the bottom spacer 170 is inserted into the case 100 while it is covered with the insulating member 180 and fixed to the electrode body 120, so that the bottom spacer 170 can be smoothly inserted into the case 100, while the bottom spacer 170 is prevented from being shifted in position in the case 100.

In addition, since the insulating member 180 is the sheet-shaped member, it can wrap around the bottom spacer 170 and fix it to the electrode body 120 with ease.

Furthermore, at least one side part and the internal part of the bottom spacer 170 are connected through the curved surface. That is, the bottom spacer 170 has the round tip end which comes in contact with the electrode body 120 when it is fixed to the electrode body 120. Thus, when the bottom spacer 170 is fixed to the electrode body 120, the electrode body 120 can be prevented from being damaged with the tip end of the bottom spacer 170.

Furthermore, at least one side part and the external part of the bottom spacer 170 are connected through the curved surface. That is, the bottom spacer 170 has the round corner part which comes in contact with the insulating member 180. Thus, even when the bottom spacer 170 and the insulating member 180 come in contact with each other due to vibration, the insulating member 180 can be prevented from being damaged with the corner part of the bottom spacer 170.

In addition, the bottom spacer 170 is the insulating member, so that even in a case where the insulating member 180 is damaged when the bottom spacer 170 is wrapped with the insulating member 180 and fixed to the electrode body 120, insulating properties between the electrode body 120 and the case 100 can be ensured.

Still furthermore, the first part 171 of the bottom spacer 170 opposed to the non-coated region A1 of the active material is thicker than the second part 172 of the bottom spacer 170 opposed to the coated region A2 of the active material. Here, it is to be noted that the non-coated region A1 is a region in which performance of the electric storage element 10 is not likely to be degraded even when compression is applied thereto. As for the electric storage element 10, in order to enhance its vibration resistance, the first part 171 opposed to the non-coated region A1 is formed to be thicker than the second part 172 in the bottom spacer 170 and compression is applied to the non-coated region A1, so that the vibration resistance can be enhanced while the performance of the electric storage element 10 is prevented from being degraded. In addition, the coated region A2 is likely to be expanded due to repeated charge-discharge, so that when compression is excessively applied thereto, the performance of the electric storage element 10 is likely to be degraded. Therefore, since the second part 172 is formed to be thinner than the first part 171 in the bottom spacer 170, a space for tolerating the expansion of the electrode body 120 can be provided, so that even when the electrode body 120 is expanded, the performance of the electric storage element 10 can be prevented from being degraded.

In addition, the clearance between the bottom spacer 170 and the coated region A2 of the electrode body 120 is larger than the clearance between the bottom spacer 170 and the non-coated region A2 of the electrode body 120. Therefore, even when the coated region A2 of the electrode body 120 is expanded due to the repeated charge-discharge, the expansion of the coated region A2 of the electrode body 120 can be tolerated because the clearance is large in the coated region A2. In addition, the electrode body 120 has the small clearance in the non-coated region A1 in which degradation in performance of the electric storage element 10 is not likely to be caused by the compression, so that the vibration resistance can be improved, while the performance of the electric storage element 10 is not degraded.

Since the shape of the first part 171 of the bottom spacer 170 on the side of the electrode body 120 follows the shape of the electrode body 120, the clearance can be minimized in the first part 171. As a result, the vibration resistance in the first part 171 can be further improved in the bottom spacer 170.

Next, a method for manufacturing the electric storage element 10 will be described.

Figure 6:
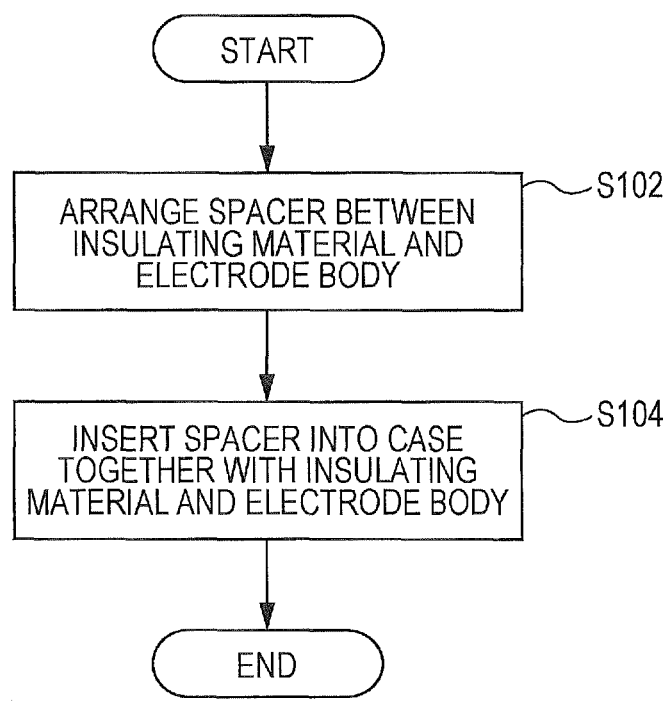
FIG. 6 is a flowchart showing one example of a method for manufacturing the electric storage element according to the embodiment of the present invention.

FIG. 6 is a flowchart showing one example of the method for manufacturing the electric storage element 10 according to the embodiment of the present invention.

Figure 7A:
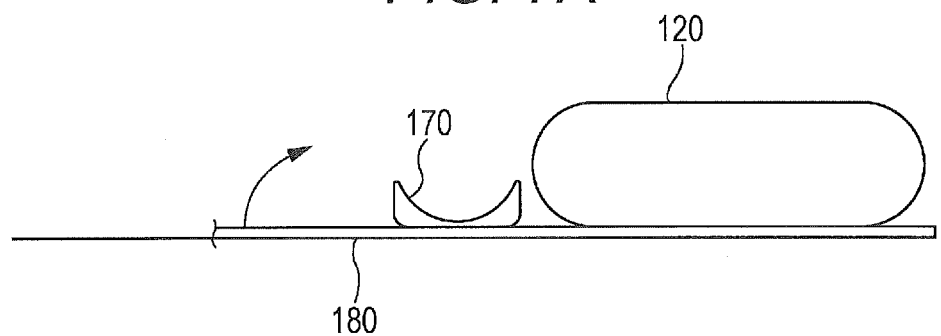
FIG. 7A is a view describing the method for manufacturing the electric storage element according to the embodiment of the present invention.
Figure 7B:
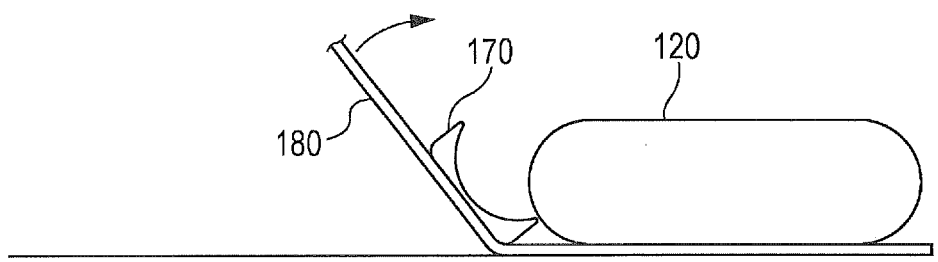
FIG. 7B is a view describing the method for manufacturing the electric storage element according to the embodiment of the present invention.
Figure 7C:
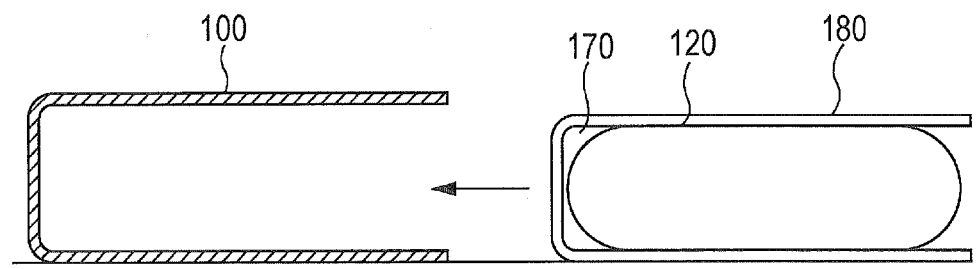
FIG. 7C is a view describing the method for manufacturing the electric storage element according to the embodiment of the present invention.

FIGS. 7A to 7C are views describing the method for manufacturing the electric storage element 10 according to the embodiment of the present invention. In FIGS. 7A to 7C, the lid plate 110, the positive electrode collector 130, the negative electrode collector 140, and the side spacers 150 and 160 are not shown.

First, as shown in FIG. 6, in a step of arranging the bottom spacer 170, the bottom spacer 170 is arranged between the insulating member 180 and the electrode body 120 (S102).

More specifically, as shown in FIG. 7A, the bottom spacer 170 is set on the insulating member 180, and attached thereto (fixed with a bonding agent or a bonding tape). Alternatively, ultrasonic welding may be used. In addition, the electrode body 120 is set sideways on the insulating member 180 adjacent to the bottom spacer 170, with its bottom opposed to the bottom spacer 170.

Then, as shown in FIG. 7B, the insulating member 180 is lifted together with the bottom spacer 170 so as to be wound around the electrode body 120. At this time, the tip end of the bottom spacer 170 abuts on the electrode body 120 as shown in FIG. 7B, but the electrode body 120 can be prevented from being damaged because the tip end of the bottom spacer 170 is rounded.

Then, as shown in FIG. 7C, the insulating member 180 is wound around the electrode body 120 so that the bottom spacer 170 and the electrode body 120 are covered with the insulating member 180. As a result, the bottom spacer 170 is arranged between the insulating member 180 and the electrode body 120.

Thus, referring to FIG. 6 again, in a step of inserting the bottom spacer 170, the bottom spacer 170 is inserted into the case 100 together with the insulating member 180 and the electrode body 120 (S104).

More specifically, as shown in FIG. 7C, the case 100 is arranged sideways so that its opening faces to a horizontal direction. Thus, the component group having the bottom spacer 170 and the electrode body 120 wrapped with the insulating member 180 is horizontally inserted into the case 100 through the opening of the case 100.

Thus, since the case 100 is arranged sideways, the case 100 can be easily held by strong force, and the component group having the bottom spacer 170 and the electrode body 120 wrapped with the insulating member 180 can be easily inserted into the case 100.

As described above, according to the method for manufacturing the electric storage element 10 in the embodiment of the present invention, the bottom spacer 170 is disposed between the insulating member 180 and the electrode body 120. That is, the bottom spacer 170 is fixed to the electrode body 120 under the condition that it is sandwiched between the insulating member 180 and the electrode body 120. Thus, the bottom spacer 170 is inserted into the case 100 under the condition that it is fixed between the insulating member 180 and the electrode body 120, whereby the electric storage element 10 is provided. In this way, since the bottom spacer 170 is inserted into the case 100 under the condition that it is fixed to the electrode body 120 with the insulating member 180, the bottom spacer 170 can be smoothly inserted into the case 100, while the bottom spacer 170 is prevented from being shifted in position in the case 100.

In addition, the bottom spacer 170 is arranged between the insulating member 180 and the electrode body 120 such that the electrode body 120 and the bottom spacer 170 are covered with the insulating member 180. That is, the electrode body 120 and the bottom spacer 170 are fixed in such a manner that the insulating member 180 wraps around the electrode body 120 and the bottom spacer 170. Therefore, since the bottom spacer 170 is inserted into the case 100 under the condition that it is covered with the insulating member 180 and fixed to the electrode body 120, the bottom spacer 170 can be smoothly inserted into the case 100, while the bottom spacer 170 is prevented from being shifted in position in the case 100.

(Variation 1)

Next, a variation 1 of this embodiment will be described. According to the above embodiment, the insulating member 180 is the sheet-shaped member. However, according to this variation 1, the insulating member is a bag-shaped member.

Figure 8:
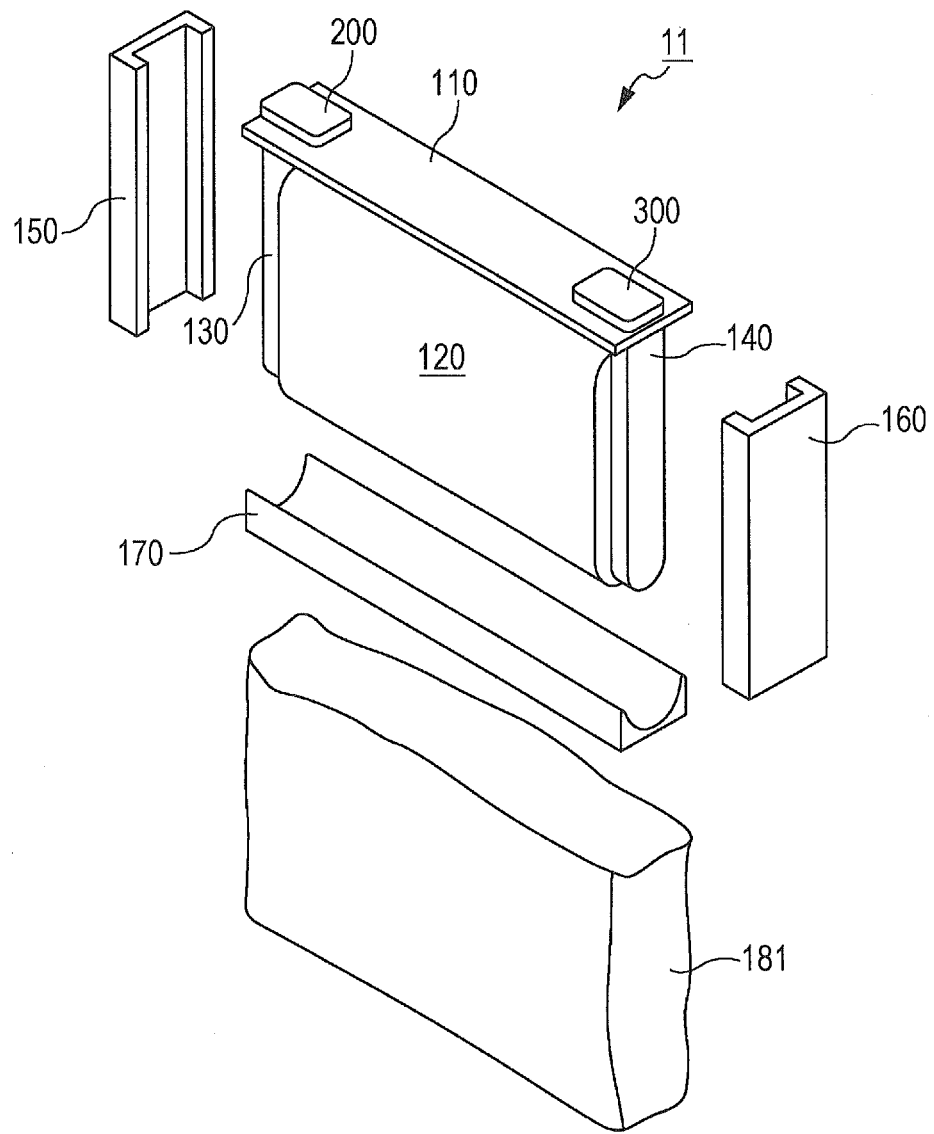
FIG. 8 is a view showing a configuration of an electric storage element according to a variation 1 of the embodiment of the present invention.

FIG. 8 is a view showing a configuration of an electric storage element 11 according to the variation 1 of the embodiment of the present invention. In FIG. 8, a configuration in the case 100 is shown, while the case 100 is not shown.

As shown in FIG. 8, the electric storage element 11 is provided with a bag-shaped insulating member 181 having an opening in its upper part. The insulating member 181 is an insulating member provided by forming an insulating sheet into a bag shape.

The insulating member 181 is arranged so as to cover the bottom spacer 170 and the electrode body 120. That is, the electrode body 120, the positive electrode collector 130, the negative electrode collector 140, the side spacers 150 and 160, and the bottom spacer 170 are housed in the insulating member 181, and then inserted into the case 100.

When the insulating member 181 is formed, its size is adjusted so as to be able to house the electrode body 120, the positive electrode collector 130, the negative electrode collector 140, the side spacers 150 and 160, and the bottom spacer 170 therein. In addition, the insulating member 181 may not have to entirely house the electrode body 120, and it may be formed so as to only cover part of a lower part of the electrode body 120.

As described above, according to the electric storage element 11 in the variation 1 of the embodiment of the present invention, the bag-shaped insulating member 181 is arranged so as to cover the electrode body 120 and the spacers (side spacers 150 and 160 and the bottom spacer 170). That is, the insulating member 181 wraps around the electrode body 120 and the spacers, and fixes the electrode body 120 and the spacers. Therefore, since the spacers are inserted into the case 100 under the condition that they are wrapped with the insulating member 181 and fixed to the electrode body 120, the spacers can be smoothly inserted into the case 100, while the spacers are prevented from being shifted in position in the case 100.

(Variation 2)

Next, a variation 2 of this embodiment will be described. According to the above embodiment, the insulating member 180 covers both of the bottom spacer 170 and the side spacers 150 and 160. However, according to this variation 2, the insulating member is arranged so as to cover the bottom spacer 170 and/or the side spacers 150 and 160.

Figure 9:
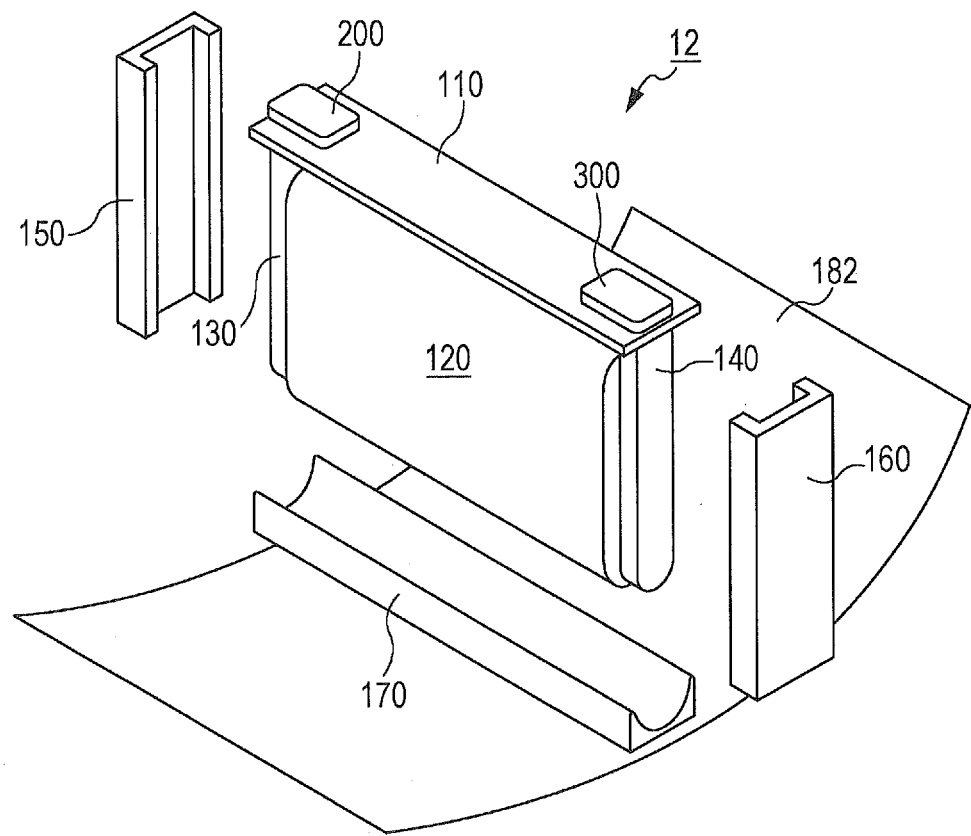
FIG. 9 is a view showing a configuration of an electric storage element according to a variation 2 of the embodiment of the present invention.
Figure 10:
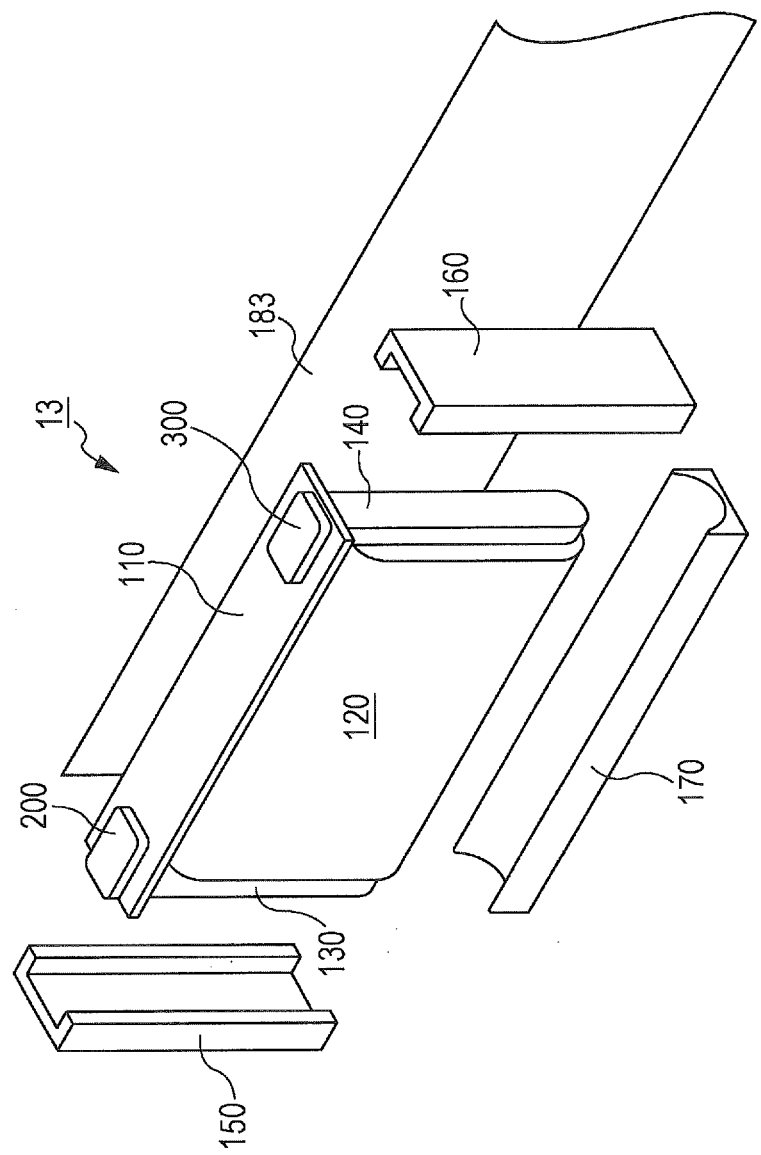
FIG. 10 is a view showing a configuration of an electric storage element according to the variation 2 of the embodiment of the present invention.
Figure 11:
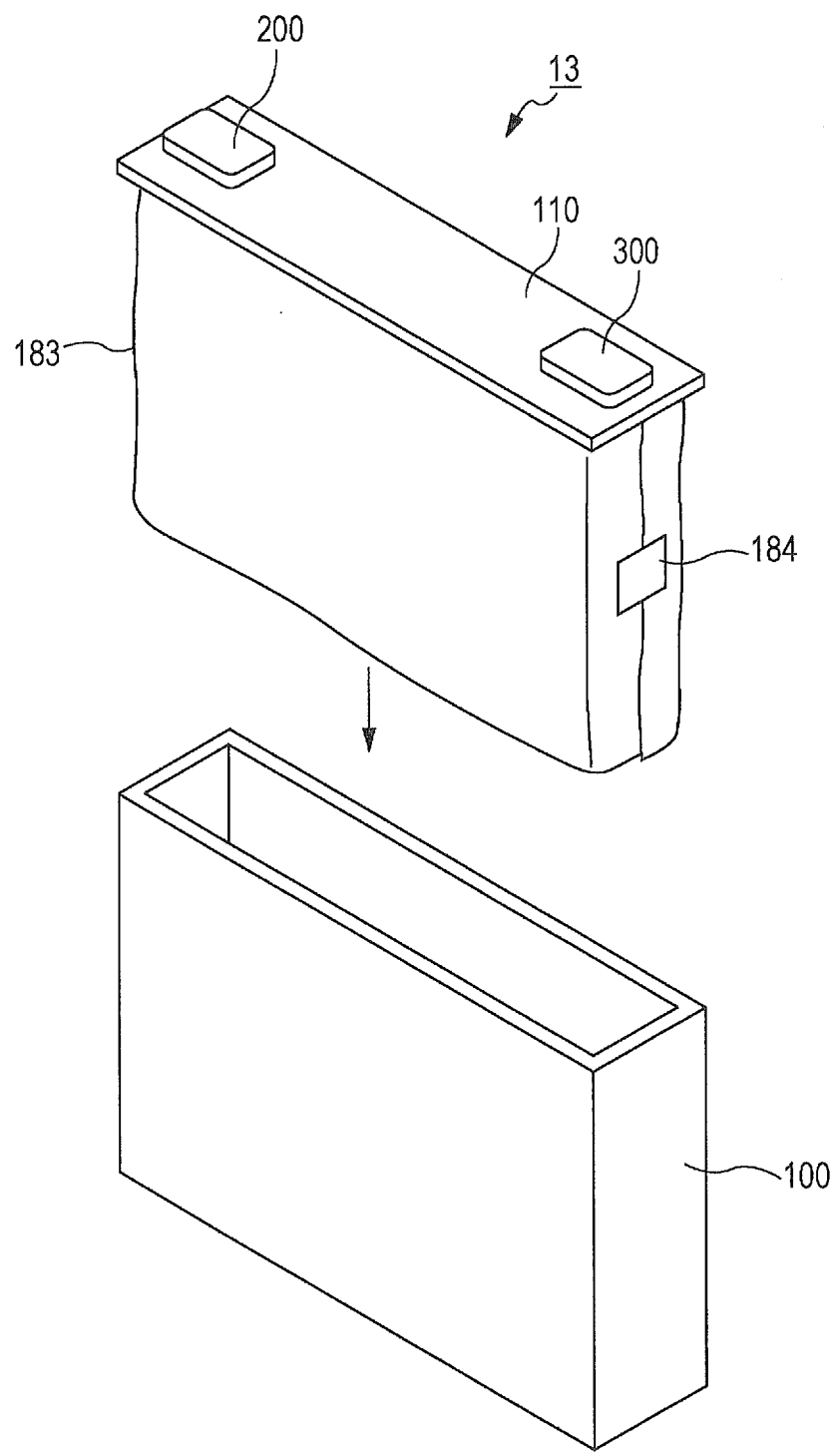
FIG. 11 is a view showing a configuration of the electric storage element according to the variation 2 of the embodiment of the present invention.

FIGS. 9 to 11 are views each showing a configuration of an electric storage element according to the variation 2 of the embodiment of the present invention. In FIGS. 9 and 10, a configuration in the case 100 is shown, while the case 100 is not shown.

As shown in FIG. 9, an electric storage element 12 is provided with a rectangular sheet-shaped insulating member 182. Thus, the insulating member 182 is arranged so as to cover the bottom spacer 170 and the electrode body 120. That is, the electrode body 120, the positive electrode collector 130, the negative electrode collector 140, the side spacers 150 and 160, and the bottom spacer 170 are covered so as to be wrapped with the insulating member 182 from beneath the electrode body 120.

When the insulating member 182 is formed, its size is adjusted so as to wrap around the electrode body 120, the positive electrode collector 130, the negative electrode collector 140, the side spacers 150 and 160, and the bottom spacer 170. The component group may be provided in such a manner that the side spacers 150 and 160 are mounted on the electrode body 120, the electrode body 120 and the side spacers 150 and 160 are wrapped with the insulating member 182 bonded or ultrasonically-welded to the spacer 170, and the insulating member 182 is thermally welded to the side spacers 150 and 160. In addition, the insulating member 182 does not have to wrap around the entire electrode body 120, but it may cover only part of the electrode body 120.

In addition, as shown in FIG. 10, an electric storage element 13 is provided with a rectangular sheet-shaped insulating member 183. The insulating member 183 is arranged so as to cover the side spacers 150 and 160, and the electrode body 120. That is, the electrode body 120, the positive electrode collector 130, the negative electrode collector 140, the side spacers 150 and 160, and the bottom spacer 170 are covered and wrapped with the insulating member 183 from the side of the electrode body 120.

Thus, as shown in FIG. 11, an end of the insulating member 183 is fixed with an adhesive tape 184, and inserted into the case 100.

When the insulating member 183 is formed, its size is adjusted so as to wrap around the electrode body 120, the positive electrode collector 130, the negative electrode collector 140, the side spacers 150 and 160, and the bottom spacer 170. In addition, the insulating member 183 does not have to wrap around the entire electrode body 120, but it may cover only part of the electrode body 120.

As for the configuration of the electric storage element 13, it is preferable that in order to prevent the electrode body 120 and the insulating member 183 from being damaged, corner parts of the side spacers 150 and 160 which come in contact with the electrode body 120 or the insulating member 183 are curved, similar to the bottom spacer 170. That is, an internal part of each of the side spacers 150 and 160 opposed to the electrode body 120, and two side parts arranged on both sides of the internal part are preferably connected through curved surfaces. It is preferable that the two side parts of each of the side spacers 150 and 160 and an external part arranged between the two side parts provided opposed to the insulating member 183 are connected through curved surfaces.

As described above, according to the electric storage elements 12 and 13 in the variation 2 of the embodiment of the present invention, the insulating members 182 and 183 are arranged so as to cover the electrode body 120 and the spacers (side spacers 150 and 160 and bottom spacer 170) from beneath and from the side, respectively. That is, each of the insulating members 182 and 183 fixes the electrode body 120 and the spacers by wrapping the electrode body 120 and the spacers from beneath or from the side. Therefore, the spacers are covered with each of the insulating members 182 and 183 from beneath or from the side and fixed to the electrode body 120, and then inserted into the case 100, so that the spacers can be smoothly inserted into the case 100, while the spacers are prevented from being shifted in position in the case 100.

(Variation 3)

Next, a variation 3 of this embodiment will be described. According to the above embodiment, the bottom spacer 170 is composed of the two first parts 171, and the second part 172 sandwiched between the two first parts 171. However, according to this variation 3, the bottom spacer 170 further includes a third part.

Figure 12:
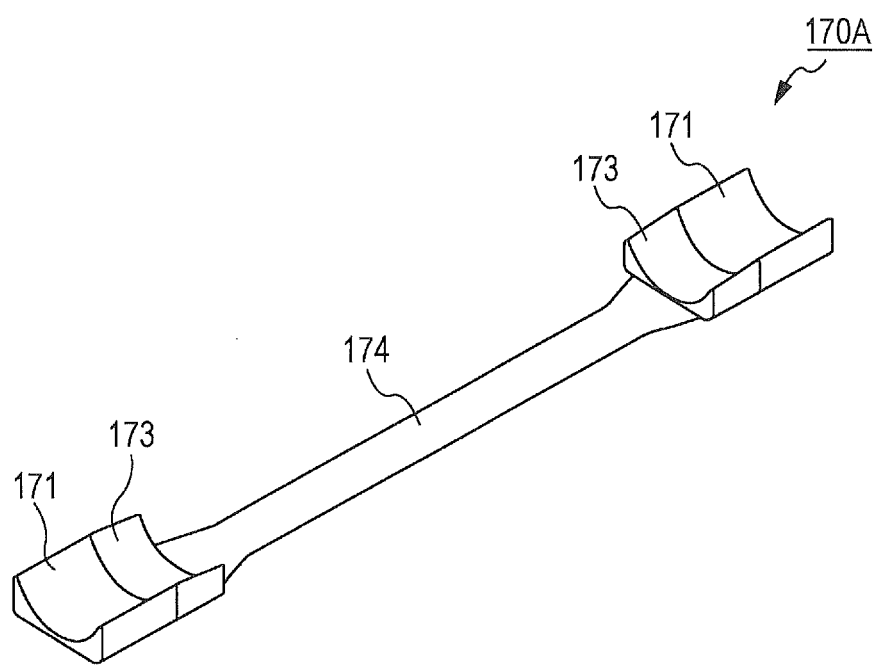
FIG. 12 is a view showing a configuration of a bottom spacer in an electric storage element according to a variation 3 of the embodiment of the present invention.

FIG. 12 is a view showing a configuration of a bottom spacer 170A of an electric storage element according to the variation 3 of the embodiment of the present invention.

As shown in FIG. 12, the bottom spacer 170A has the two first parts 171 arranged in both ends in a longitudinal direction, and two second parts 173 connected to the two first parts 171, respectively. In addition, the bottom spacer 170A has a third part 174 between the two second parts 173.

The third part 174 is a flat portion thinner than the two second parts 173. That is, the bottom spacer 170A has a configuration provided by forming a thinner center part in the center of the bottom spacer 170 in the above embodiment.

Incidentally, the shape of the third part 174 is not limited to the flat shape, and may be any shape such as a curved shape. Furthermore, the first part 171, the second part 173, and the third part 174 may be made of the same material, or may be made of different materials.

As described above, the bottom spacer 170A of the electric storage element according to the variation 3 of the embodiment of the present invention has the third part 174 thinner than the second part 173, between the two second parts 173. That is, the electrode body 120 can be supported with the first parts 171 and the second parts 173 of the bottom spacer 170A, so that the third part 174 which is not used for supporting the electrode body 120 can be thinned, and costs can be reduced due to a reduction in amount of a component material.

(Variation 4)

Next, a variation 4 of this embodiment will be described. According to the above embodiment and its variations, the side part and the external part of the first part, and the side part and the external part of the second part in the bottom spacer have the flat shape, but according to this variation 4, each of a side part and an external part of a bottom spacer has a curved shape.

Figure 13A:
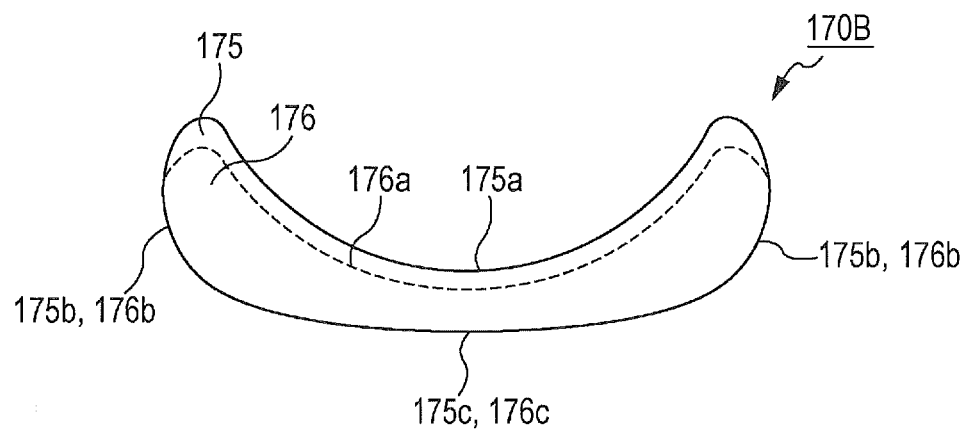
FIG. 13A is a view describing a bottom spacer in an electric storage element according to a variation 4 of the embodiment of the present invention.
Figure 13B:
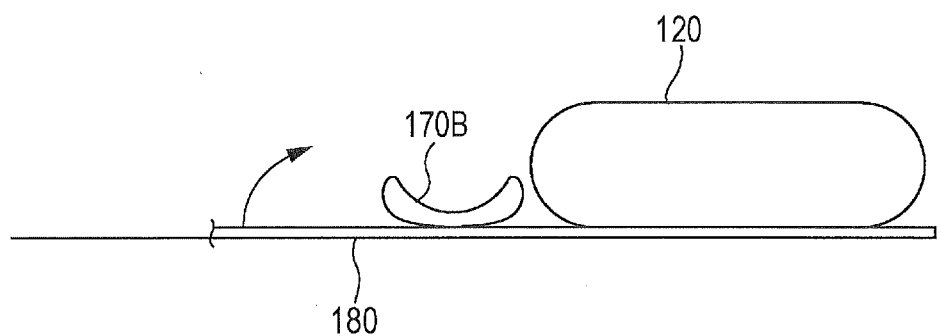
FIG. 13B is a view describing the bottom spacer in the electric storage element according to the variation 4 of the embodiment of the present invention.
Figure 13C:
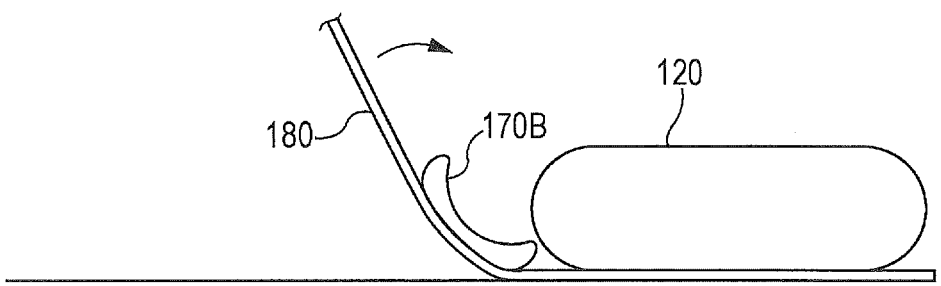
FIG. 13C is a view describing the bottom spacer in the electric storage element according to the variation 4 of the embodiment of the present invention.

FIG. 13A to FIG. 13C are views each describing a bottom spacer 170B of an electric storage element according to the variation 4 of the embodiment of the present invention. More specifically, FIG. 13A is a view corresponding to the bottom spacer 170 in FIG. 5B, and FIGS. 13B and 13C are views corresponding to the method for manufacturing the electric storage element 10 in FIGS. 7A and 7B, respectively.

As shown in FIG. 13A, the bottom spacer 170B is provided with a first part 175 and a second part 176. The first part 175 has an internal part 175a as an upper surface, two side parts 175b as side surfaces, and an external part 175c as a bottom surface. Similarly, the second part 176 has an internal part 176a as an upper surface, two side parts 176b as side surfaces, and an external part 176c as a bottom surface.

Each of the two side parts 175b, the external part 175c, the two side parts 176b, and the external part 176c has a curved shape. That is, the side part 175b has a curved surface arranged on each side of the internal part 175a, and the external part 175c has a curved surface arranged between the two side parts 175b and opposed to the insulating member 180. Furthermore, the side part 176b has a curved surface arranged on each side of the internal part 176a, and the external part 176c has a curved surface arranged between the two side parts 176b and opposed to the insulating member 180.

Thus, according to processes for manufacturing the electric storage element having the above bottom spacer 170B, as shown in FIG. 13B, the bottom spacer 170B is put on the insulating member 180 adjacent to the electrode body 120, and as shown in FIG. 13C, the insulating member 180 is lifted together with the bottom spacer 170B so as to be wound around the electrode body 120, so that the insulating member 180 is wound around the electrode body 120.

At this time, since each of the side part and the external part of the bottom spacer 170B has the curved surface, the insulating member 180 can be smoothly bent. Thus, the bottom spacer 170B is inserted into the case 100 together with insulating member 180 and the electrode body 120.

Incidentally, the side part and the external part of the bottom spacer 170B need not entirely have the curved shape, but the curved shape may be partially provided in one part of the two side parts 175b, the external part 175c, the two side parts 176b, and the external part 176c.

(Variation 5)

Next, a variation 5 of this embodiment will be described. According to the above embodiment and its variations, the side spacer and the bottom spacer are separately provided. However, according to this variation 5, a spacer has a side part functioning as a side spacer, and a bottom part functioning as a bottom spacer.

Figure 14:
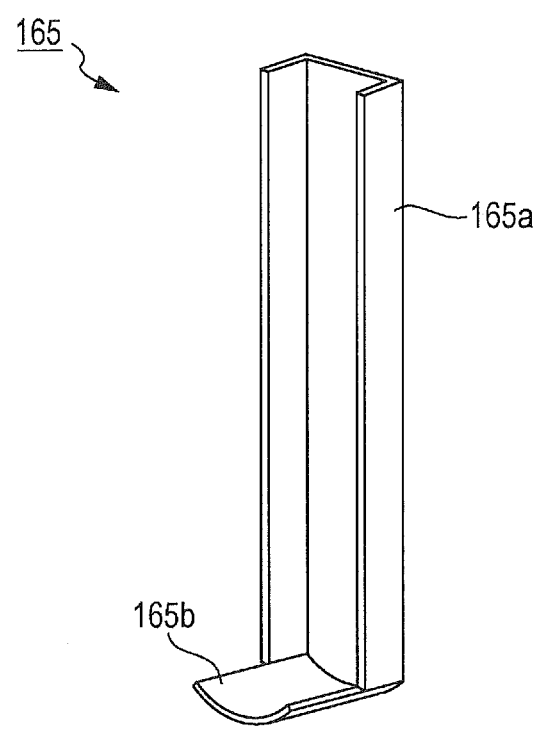
FIG. 14 is a view describing a spacer in an electric storage element according to a variation 5 of the embodiment of the present invention.

As shown in FIG. 14, a spacer 165 of an electric storage element according to the variation 5 has a side part 165a and a bottom part 165b. A configuration of this electric storage element other than this spacer is similar to the electric storage element shown in FIG. 9. The side part 165a is arranged along a side wall of a case. The bottom part 165b is arranged along a bottom surface of the case. The side part 165a extends in a direction roughly perpendicular to the bottom part 165b. The spacer 165 is mounted on the electrode body 120 shown in FIG. 9, and then the bottom part 165b is wrapped with the insulating member 182 together with the electrode body 120.

In the above, the electric storage elements according to the embodiment and its variations in the present invention have been described, but the present invention is not limited to the embodiments and its variations.

That is, it is to be thought that the embodiment and its variations disclosed here are illustrative and not restrictive in all respects. The scope of the present invention is not limited by the above description but limited only by the terms of the appended claims, and it will be obvious that various changes may be made within the meaning and scope equivalent to the appended claims. In addition, an embodiment configured by arbitrarily combining the above embodiment and variations is also included in the scope of the present invention.

For example, according to the above embodiment, the bottom spacer 170 has the first part 171, and the second part 172 thinner than the first part 171. Instead, the bottom spacer 170 may have the first part 171, and the second part 172 lower in hardness than the first part 171. Furthermore, the bottom spacer 170 may have only the first part 171 without having the second part 172. In these configuration also, the bottom spacer 170 can support the electrode body 120 while tolerating the expansion of the electrode body 120.

The preset invention can be applied to the electric storage element in which the spacer can be smoothly inserted into the case, while the spacer can be prevented from being shifted in position in the case.

What is claimed is:

1. An electric storage element, comprising:
an electrode body including a positive electrode and a negative electrode;
a case including a case body for housing the electrode body and a lid plate that covers an opening of the case body, the lid plate being formed with an electrode terminal;
an insulating member arranged in the case to insulate the electrode body from the case; and
a spacer arranged in the case, wherein the insulating member includes a sheet-shaped member that covers the spacer and the electrode body, and wherein the spacer is arranged between the insulating member and the electrode body.

2. The electric storage element according to claim 1, wherein the spacer is configured to reduce a space between the electrode body and the case, and to suppress the electrode body from moving in the case.

3. The electric storage element according to claim 1, wherein the insulating member is bonded or welded to the spacer.

4. The electric storage element according to claim 1, wherein the spacer includes an internal part opposed to the electrode body, and two side parts arranged on both sides of the internal part, and wherein at least one side part of the two side parts and the internal part are connected through a curved surface.

5. The electric storage element according to claim 1, wherein the spacer includes an internal part opposed to the electrode body, two side parts arranged on both sides of the internal part, and an external part arranged between the two side parts and opposed to the insulating member, and wherein at least one side part of the two side parts and the external part are connected through a curved surface.

6. The electric storage element according to claim 1, wherein the spacer includes an insulating element.

7. The electric storage element according to claim 1, wherein the electrode body includes a coated region including active materials applied to surfaces of the positive electrode and the negative electrode, and a non-coated region not including the active material on the surface of the positive electrode or the negative electrode, wherein the spacer includes a first part opposed to the non-coated region, and a second part opposed to the coated region, and wherein the first part is thicker than the second part.

8. The electric storage element according to claim 7, wherein a clearance between the second part of the spacer and the coated region of the electrode body is larger than a clearance between the first part of the spacer and the non-coated region of the electrode body.

9. The electric storage element according to claim 7, wherein a configuration of the first part of the spacer on a side of the electrode body follows an outer surface of the electrode body.

10. The electric storage element according to claim 7, wherein the spacer includes two first parts arranged at both ends in a longitudinal direction, two second parts connected to the two first parts, respectively, and a third part thinner than the two second parts, between the two second parts.

11. A method for manufacturing an electric storage element comprising an electrode body including a positive electrode and a negative electrode, a case including a case body for housing the electrode body and a lid plate that covers an opening of the case body, the lid plate being formed with an electrode terminal, an insulating member arranged in the case to insulate the electrode body from the case, and a spacer arranged in the case, the method comprising:

arranging the spacer between the insulating member and the electrode body; and inserting the spacer into the case together with the insulating member and the electrode body, wherein the insulating member includes a sheet-shaped member that covers the spacer and the electrode body.

12. The method for manufacturing the electric storage element according to claim 11, wherein in the arranging, the spacer is arranged between the insulating member and the electrode body such that the spacer and the electrode body are covered with the insulating member.

13. The method for manufacturing the electric storage element according to claim 12, wherein in the arranging, the spacer is set on the insulating member, wherein the electrode body, which is formed into an oval shape by winding the positive electrode and the negative electrode, which are elongated band-shaped, around a winding axis, is put sideways, and wherein the insulating member is wound around the electrode body such that the spacer is arranged between the insulating member and the electrode body.

14. The method for manufacturing the electric storage element according to claim 11, wherein the electrode body includes a coated region including active materials applied to surfaces of the positive electrode and the negative electrode, and a non-coated region not including the active material on the surface of the positive electrode or the negative electrode.

15. The method for manufacturing the electric storage element according to claim 14, wherein the spacer includes a first part opposed to the non-coated region, and a second part opposed to the coated region, and wherein the first part is thicker than the second part.

16. The method for manufacturing the electric storage element according to claim 11, wherein the space comprises a bottom spacer, and wherein the bottom spacer is inserted into the case ahead of the electrode body and is pushed by the electrode body toward a bottom surface of the case under a condition that the bottom spacer is fixed to the electrode body with the insulating member, such that while the bottom spacer is inserted into the case, the bottom spacer is prevented from being shifted in position in the case.

17. The electric storage element according to claim 1, wherein the space comprises a bottom spacer, and wherein the bottom spacer is configured to be inserted into the case ahead of the electrode body and to be pushed by the electrode body toward a bottom surface of the case under a condition that the bottom spacer is fixed to the electrode body with the insulating member, such that while the bottom spacer is inserted into the case, the bottom spacer is prevented from being shifted in position in the case.

18. The electric storage element according to claim 1, wherein the electrode body includes a coated region applied to surfaces of the positive electrode and the negative electrode, and a non-coated region not including an active material on the surface of the positive electrode or the negative electrode, and wherein the spacer includes a first part opposed to the non-coated region, and a second part opposed to the coated region.

* * * * *